(12) United States Patent
Gould et al.

(10) Patent No.: US 10,885,628 B2
(45) Date of Patent: Jan. 5, 2021

(54) SINGLE IMAGE COMPLETION FROM RETRIEVED IMAGE COLLECTIONS

(71) Applicant: Seesure, Ainslie ACT (AU)

(72) Inventors: Stephen Gould, Ainslie ACT (AU); Samuel Toyer, Ainslie ACT (AU); David Reiner, Yarralmula ACT (AU)

(73) Assignee: SEESURE, Ainslie Act (AU)

( * ) Notice: Subject to any disclaimer, the term of this patent is extended or adjusted under 35 U.S.C. 154(b) by 69 days.

(21) Appl. No.: 16/394,410

(22) Filed: Apr. 25, 2019

(65) Prior Publication Data

US 2019/0385292 A1   Dec. 19, 2019

Related U.S. Application Data

(60) Provisional application No. 62/662,699, filed on Apr. 25, 2018.

(51) Int. Cl.
*G06K 9/00* (2006.01)
*G06T 7/00* (2017.01)
*G06N 3/08* (2006.01)

(52) U.S. Cl.
CPC .............. *G06T 7/001* (2013.01); *G06N 3/08* (2013.01); *G06T 7/97* (2017.01); *G06T 2207/20004* (2013.01); *G06T 2207/20084* (2013.01)

(58) Field of Classification Search
CPC .......... G06K 9/66; G06K 9/4628; G06K 9/32; G06K 9/2013; G06K 9/344; G06T 7/001; G06T 7/97; G06T 2207/2004; G06T 2207/20084; G06N 3/08
See application file for complete search history.

(56) References Cited

U.S. PATENT DOCUMENTS

| 10,140,544 B1* | 11/2018 | Zhao ........................ G06T 7/143 |
| 10,235,771 B2* | 3/2019 | Rad ...................... G06K 9/00208 |
| 10,410,118 B2* | 9/2019 | Xiong ..................... G06N 3/084 |
| 10,482,584 B1* | 11/2019 | Kim ......................... G06K 9/40 |
| 10,671,855 B2* | 6/2020 | Lee ..................... G06K 9/00765 |
| 10,672,174 B2* | 6/2020 | Kavidayal ............ G06K 9/6256 |
| 2013/0060790 A1* | 3/2013 | Chertok .............. G06K 9/6284 707/752 |

(Continued)

OTHER PUBLICATIONS

WIPO Application No. PCT/IB2019/053421, International Search Report and Written Opinion of the International Searching Authority, dated Sep. 3, 2019.

*Primary Examiner* — Amir Alavi
(74) *Attorney, Agent, or Firm* — Alston & Bird LLP

(57) ABSTRACT

A method of completing a masked image includes, in part, identifying a multitude of images that are visually similar to the masked image, retrieving a first subset of images from the multitude of images, setting parameters of a neural network to a first set of values in accordance with the data represented by the first retrieved subset, and using the neural network with the first set of parameters to complete the masked image if the neural network having the first set of parameters is determined to meet a threshold value. If the neural network having the first set of parameters is determined not to meet the threshold value, in an iterative manner, another subset of images different from the first subset is retrieved, and the parameters of the neural network are then updated in accordance with the data represented by the other subset until the threshold value is met.

20 Claims, 6 Drawing Sheets

(56) References Cited

U.S. PATENT DOCUMENTS

| | | |
|---|---|---|
| 2015/0339838 A1 | 11/2015 | Friedman et al. |
| 2016/0358337 A1 | 12/2016 | Dai et al. |
| 2017/0039723 A1 | 2/2017 | Price et al. |
| 2017/0076142 A1 | 3/2017 | Chang |
| 2017/0091951 A1 | 3/2017 | Yoo et al. |
| 2018/0373975 A1* | 12/2018 | Yu .......................... G06N 3/04 |
| 2019/0385292 A1* | 12/2019 | Gould ..................... G06T 7/174 |
| 2020/0143204 A1* | 5/2020 | Nakano ................ G06K 9/6262 |
| 2020/0174380 A1* | 6/2020 | Huang .................. G06F 30/398 |

* cited by examiner

SINGLE IMAGE COMPLETION FROM RETRIEVED IMAGE COLLECTIONS

CROSS-REFERENCE TO RELATED APPLICATION

The present application claims benefit under 35 USC 119(e) of U.S. Patent Application No. 62/662,699, filed Apr. 25, 2018, the content of which is incorporated herein by reference in its entirety.

FIELD OF THE INVENTION

The present invention relates to artificial intelligence, and more particularly to forming images using artificial intelligence.

BACKGROUND OF THE INVENTION

A common operation in digital image manipulation and editing is to remove an object or region from an existing image. Image editing software such as Photoshop and Gimp provide tools, such as "smart erase" and "content-aware fill" for semi-automating the removal operation. Usually the process of removing an object or region and filling in the background is iterative with only a small number of pixels erased at each time. The erased pixels and the immediate surrounding pixels are re-painted and blended with the rest of the image. Using these tools, a user can guide the software to erase large objects and fill in the missing parts of the image to make the manipulated image look as natural as possible. Therefore, a person viewing the manipulated image should not be able to easily tell that it had been modified in anyway, and more particularly that the filled-in region is a plausible reconstruction of what the scene could have looked like were the image taken without the removed object or region in it.

More recently algorithms have been developed for automatically filling image regions that have been erased with plausible reconstructions. Such algorithms, known as image completion or inpainting algorithms, are provided with an image and masked region and attempt to paint pixels into the masked region with the same goals as stated above, namely a person viewing the automatically completed image should not be able to perceive that it has been manipulated in any way. State of the art techniques use deep neural network models, and, more particularly convolutional neural networks (CNNs), that have been trained on a large corpus of images to reconstruct missing parts of image in the corpus. In some cases, additional cues are given to guide the image completion, such as user provided boundary sketches or an auxiliary image with the desired targeted texture or features.

An example of an image, mask and automatically completed region is shown in FIGS. 1A-1D. FIG. 1A shows a cup 10 positioned in front of a tape dispenser 12, a stapler 14 a pen holders 16, and a number of other pens/pencils 18 that appear to have been placed in a second pen holder not visible in FIG. 1A, a ruler 20, a notepad 22 and a pen 24. FIG. 1B shows a mask 30. FIG. 1C shows mask 20 after it is superimposed on a region of FIG. 1A. FIG. 1D shows what FIG. 1A would have looked like if the masked region were not present in FIG. 1A.

BRIEF SUMMARY OF THE INVENTION

A method of training a neural network to complete an image when masked, in accordance with one embodiment of the present invention, includes, in part, identifying a multitude of images that are visually similar to the image being masked, forming a first subset of images from the multitude of images, setting the parameters of a neural network to a first set of values in accordance with the data represented by the first subset, and using the neural network having the first set of parameter values to complete the masked image if the neural network having the first set of parameter values is determined to meet a threshold value.

If the neural network having the first set of parameters is determined not to meet the threshold value, another subset of images, different from the first subset, is formed from the multitude of images. The parameters of the neural network are then updated in accordance with the data represented by the newly formed subset. A determination is then made to access whether the neural network with the updated parameter values meets a threshold value. If so, the neural network with the updated parameter values is applied to complete the masked image. If not, the process of forming another subset of images, and updating the parameters of the neural network in accordance with the new subset of images is repeated iteratively until the threshold value is met.

In one embodiment, the threshold value is defined by a convergence of the neural network. In another embodiment, the threshold value is defined by a maximum number of updates to the parameters. In one embodiment, the multitude of images are identified by searching a collection of images. In one embodiment, the mask is variable.

In one embodiment, the method further includes, in part, performing a post-processing on the completed image. In one embodiment, each image subset is formed by sampling image-mask pairs. In one embodiment, the sampling is a random sampling. In one embodiment, the neural network is a convolutional neural network.

A computer system with a neural network and configured to complete an image when masked, in accordance with one embodiment of the present invention, is further configured to identify a multitude of images that are visually similar to the image being masked, form a first subset of images from the multitude of images, set the parameters of the neural network to a first set of values in accordance with the data represented by the first subset, and use the neural network having the first set of parameter values to complete the masked image if the neural network having the first set of parameter values is determined to meet a threshold value.

If the neural network having the first set of parameters is determined not to meet the threshold value, the computer system forms another subset of images, different from the first subset, from the multitude of images. The computer system then updates the parameters of the neural network in accordance with the data represented by the newly formed subset. A determination is then made to access whether the neural network with the updated parameter values meets a threshold value. If so, the neural network with the updated parameter values is applied to complete the masked image. If not, the computer system repeats the process of forming another subset of images and updating the parameters of the neural network in accordance with the new subset of images iteratively until the threshold value is met.

In one embodiment, the threshold value is defined by a convergence of the neural network. In another embodiment, the threshold value is defined by a maximum number of updates to the parameters. In one embodiment, the multitude of images are identified by searching a collection of images. In one embodiment, the mask is variable.

In one embodiment, the computer system is further configures to, in part, perform a post-processing on the completed image. In one embodiment, each image subset is formed by sampling image-mask pairs. In one embodiment, the sampling is a random sampling. In one embodiment, the neural network is a convolutional neural network.

DETAILED DESCRIPTION OF THE INVENTION

Embodiments of the present invention improve the quality of image completion by guiding a deep neural network based model with images that have similar content to the one being edited. More specifically, embodiments of the present invention fine-tune the parameters of the neural network based model using a set of images that have been retrieved from a content-based search procedure, which looks for images that appear similar (but not identical) to the one from which the object or region is being removed. Because the image completion model is refined for every specific image being edited, embodiments of the present invention complete the masked regions with more relevant content than a pre-trained model.

Figure 1A:
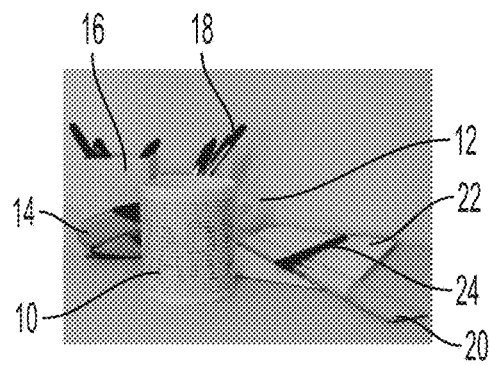
FIG. 1A show an image, as known in the prior art.
Figure 1B:
FIG. 1B shows a mask, as known in the prior art.
Figure 1C:
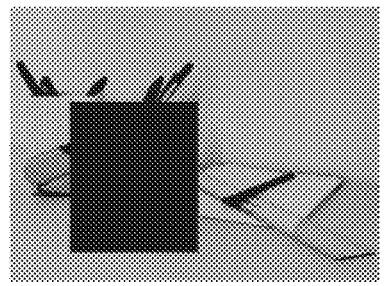
FIG. 1C shows the mask of FIG. 1B superimposed on a region of FIG. 1A, as known in the prior art.
Figure 1D:
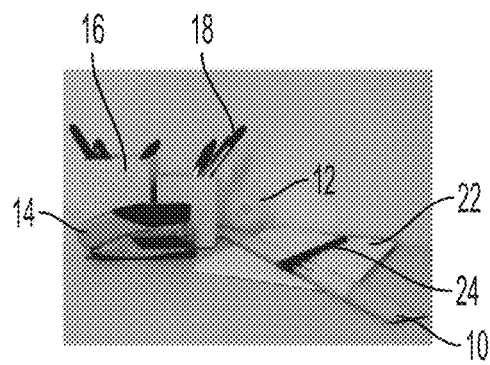
FIG. 1D shows what FIG. 1A would like when the region covered by the mask is removed therefrom, as known in the prior art.
Figure 2A:
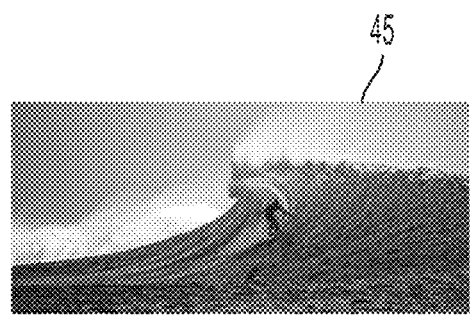
FIG. 2A shows an image, as known in the prior art.
Figure 2B:
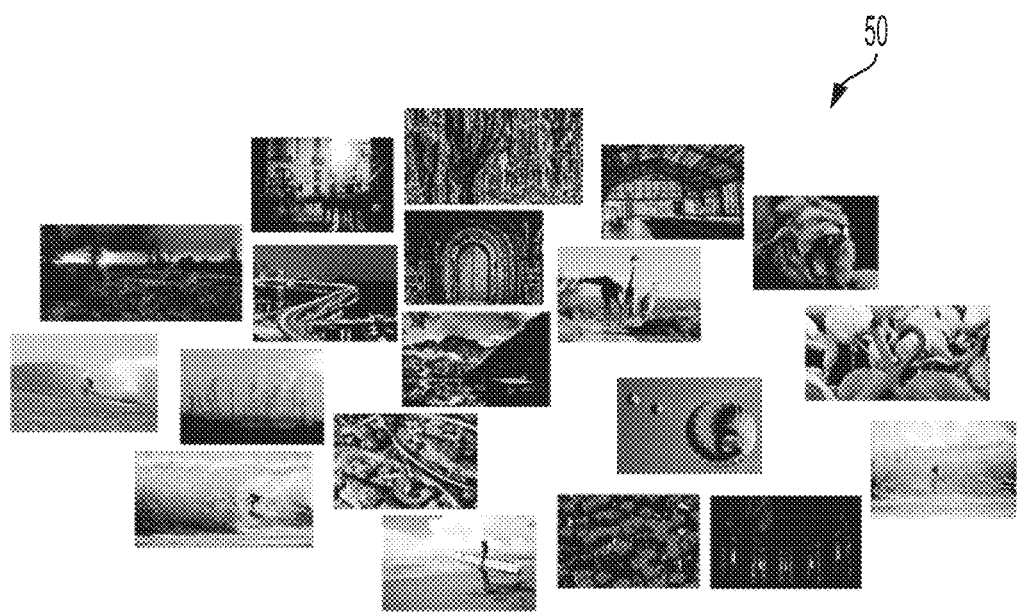
FIG. 2B shows a collection if images, as known in the prior art.
Figure 2C:
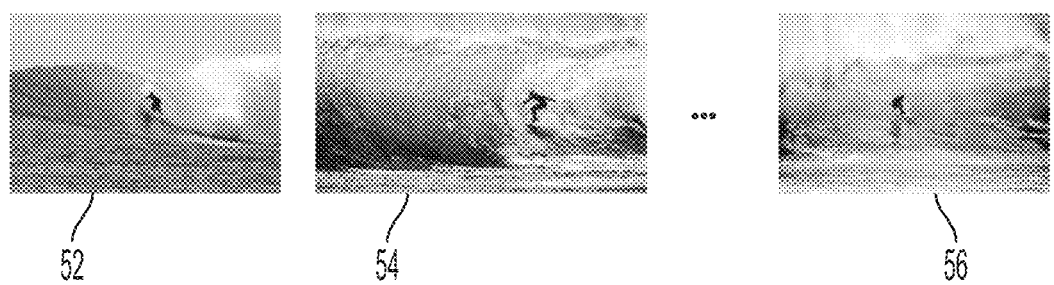
FIG. 2C shows a set of images retrieved from FIG. 2B and that are visually similar to FIG. 2A, as known in the prior art.

FIG. 2A is an image 45 of interest, i.e. the query image, showing a surfer riding a wave. FIG. 2B shows a collection of images 50 being searched to determine therefrom images matching image 45 shown in FIG. 2A. FIG. 2C shows images 52, 54, 56, retrieved from image collection 50, matching query image 45. Image collection 50 may include millions of images of diverse scenes from different viewpoints, lighting conditions, etc. The search results forming the retrieved set, shown in FIG. 2C, may include hundreds to thousands of images similar in appearance to query image 45.

The construction of the retrieved set (such as the set shown in FIG. 2C) used to fine-tune the image inpainting may be achieved using Content-Based Image Retrieval (CBIR) techniques. Such techniques may use a descriptor function, a similarity measure, and a nearest-neighbor search method. The descriptor function d(I), such as the Fuzzy Color and Texture Histogram (FCTH) descriptor or the Color and Edge Directivity Descriptor (CEDD), maps a high-dimensional image I to a low-dimensional vector, which captures the global appearance and structure of that image.

A similarity measure $s(d_1, d_2)$ provides a degree of similarity between two descriptors $d_1$ and $d_2$ under the assumption that images with similar descriptors must have similar appearance. For instance, this measure may be the negative squared Euclidean distance $s(a, b) = -\|a-b\|_2^2$ or the cosine similarity measure $$s(a, b) = \frac{a \cdot b}{\|a\| \cdot \|b\|}.$$

The nearest-neighbor search method is used to scan a large database of pre-computed descriptors $d_1, \ldots, d_N$ to find the K descriptors $d_1, \ldots, d_K$, and hence K images, which have maximum similarity $s(d_q, d_i)$ to a query descriptor $d_q$. The search may be accelerated using specialized data structures like the k-d tree or approximation methods such as locality sensitive hashing (LSH).

Embodiments of the present invention provide a method and a system for image completion. To achieve this, the descriptors $d_1, \ldots, d_N$ of each of the N images in an image collection are pre-computed and added to a database. In one aspect, a data structure for accelerating subsequent search queries may be formed. Next, the descriptor of the query image (i.e., the image that has been provided) is computed and used as the query descriptor $d_q$. Thereafter, for example, a nearest-neighbor search method, is used to find the K closest descriptors to $d_q$. The images corresponding to the descriptors constitute the retrieval set.

Figure 3:
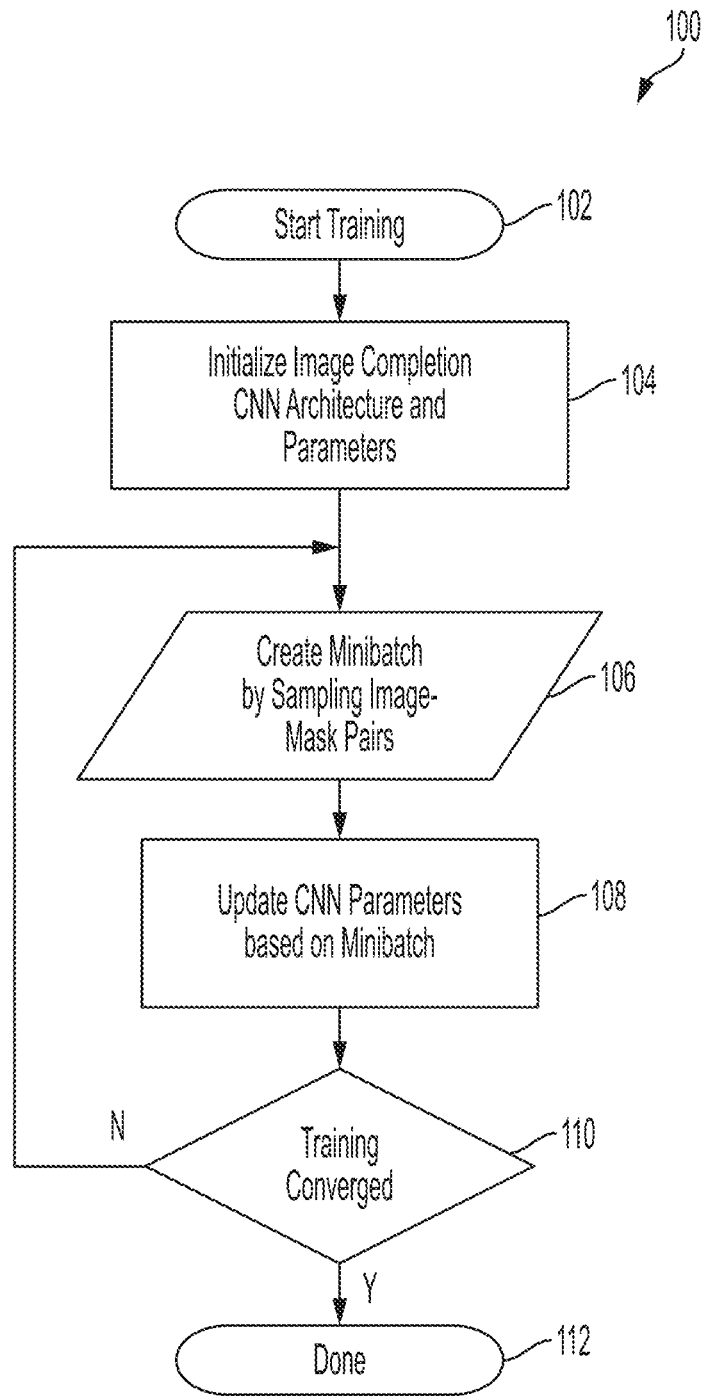
FIG. 3 shows a flowchart for training a convolutional neural network to perform image completion, as known in the prior art.

FIG. 3 shows a conventional flowchart 100 used to train a convolutional neural network to perform image completion. Training starts at 102 subsequent to which a convolutional neural network architecture and its associated parameters are initialized at 104. Next, at 106, a mini batch is iteratively created by sampling image-mask pairs. The training algorithm then iteratively updates the convolutional neural network parameters to improve the quality of image completion on a set of training images. Each mini-batch may include tens to hundreds of images obtained by selecting a subset of images from the training dataset and randomly generating masks for those images. In some methods the masks may be pre-determined. The parameters of the convolutional neural network are then updated at 108, typically using stochastic gradient descent with gradient computed via backpropagation. The image completion algorithm with current parameter settings then infills the masked region on a validation set of images and their quality is assessed. Training iterations are repeated at 110 until convergence or a maximum number of iterations, typically many thousands, is reached. The training ends at 112. With a trained convolutional neural network image completion model in hand, a user can provide new images and masks for the algorithm to complete.

Figure 4:
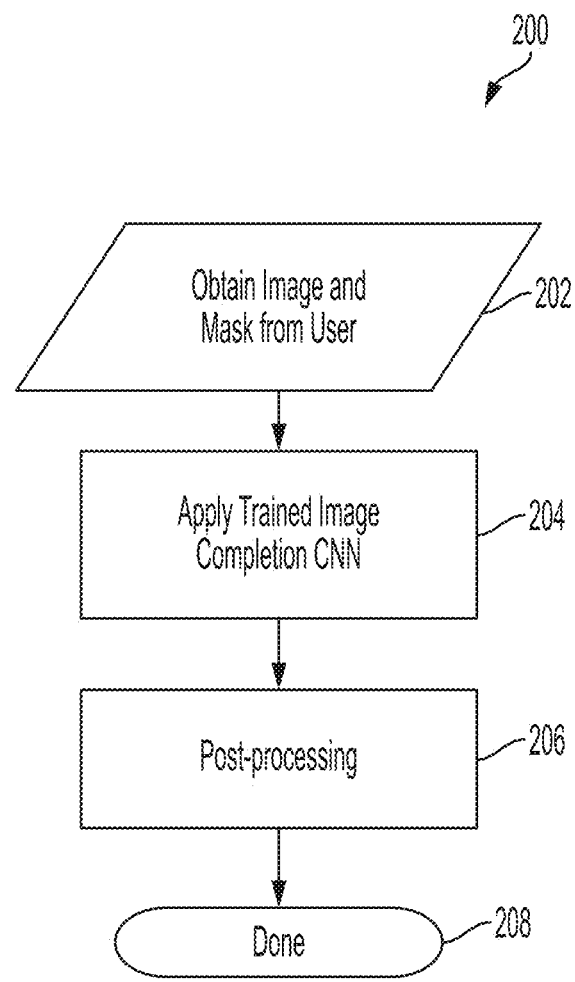
FIG. 4 shows a flowchart for applying a trained convolutional neural network to perform image completion, as known in the prior art.

FIG. 4 shows a conventional flowchart 200 for invoking a trained convolutional neural network based model to complete a masked region of a new image provided by a user. After obtaining the image and mask from the user at 202, the trained convolutional neural network is applied at 204 to perform image completion. Thereafter, following a post-processing step at 206 to further improve the perceptual quality of the infilled region by blending it with the surrounding pixels, the process ends at 208.

Figure 5:
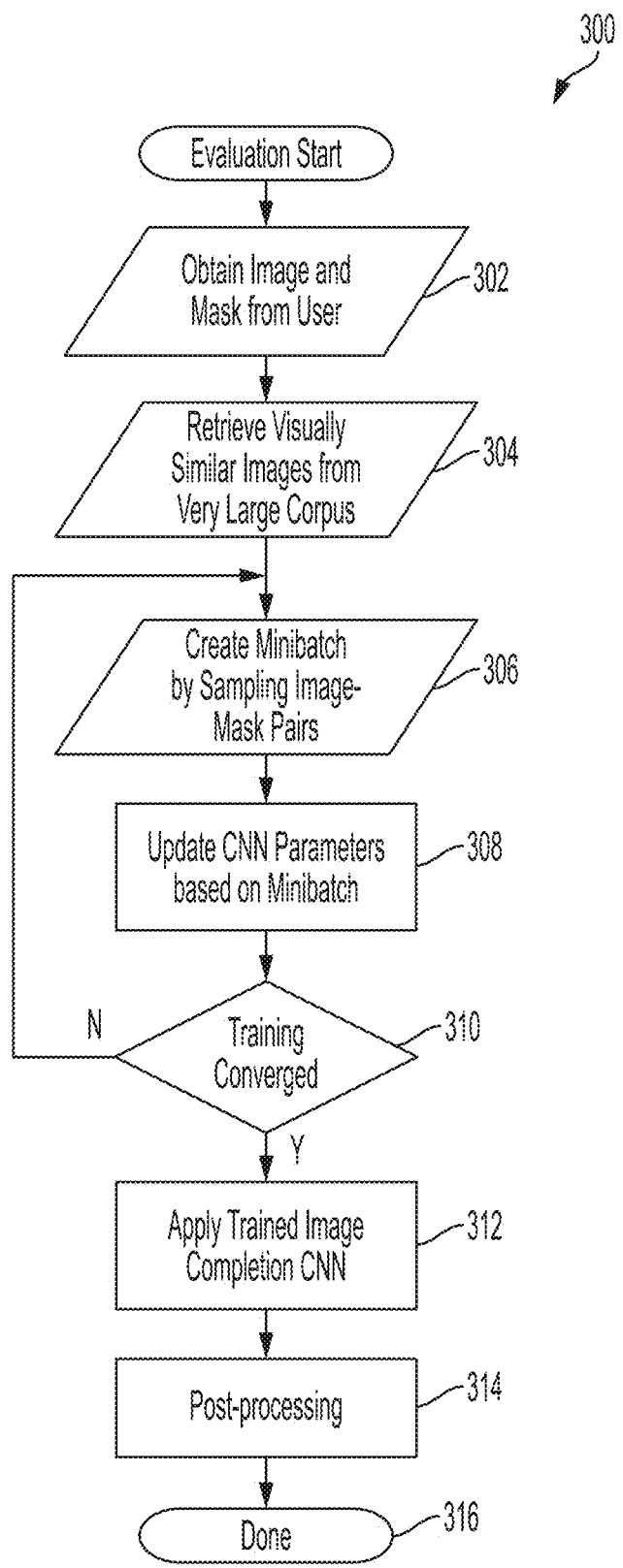
FIG. 5 shows a flowchart for training a convolutional neural network and applying the trained neural network to perform image completion, in accordance with one embodiment of the present invention.

FIG. 5 shows a flowchart 300 for performing image completion, in accordance with one embodiment of the present invention. At 302 the query image and mask are obtained from the user. Next, at 304, a relatively large collection of images is searched to identify and retrieve images that are visually similar to the query image. At 306, from the images so retrieved a mini-batch is formed at 306. The mini-batch formed at 306 during each iteration may include tens to hundreds of images. Then, at 308 the parameters of the neural network parameters are updated based on the retrieved mini-batch obtained at 306 to improve the quality of image completion on the mini batch.

If at 310 a determination is made that the trained neural network having the updated parameter meets a predefined threshold value, characterized either by a convergence criteria or a maximum number of iterations defined by the loop involving 306, 308, 310, the trained the neural network is applied to image completion at 312. To achieve this, in one embodiment, the image completion algorithm with the current parameter settings infills the masked region to determine its quality. Thereafter, a post-processing step is performed at 314 to further improve the perceptual quality of the infilled region by blending it with the surrounding pixels following which image completion ends at 316. Because the parameters of the neural network are changed to improve the quality of image completion on images in the retrieved set that are similar to the one provided by the user, the final quality of the image provided by a neural network trained in accordance with embodiments of the present invention is substantially enhanced.

If at 310, a determination is made that the trained neural network having the updated parameters does not meet the predefined threshold, the process moves to 306 at which point a new mini batch is created by sampling image mask pairs. The parameters of the neural network are then updated at 308 based on the newly created mini batch. Thereafter, a determination is made at 310 as to whether the neural network having parameters updated in accordance with the newly created mini batch meet the threshold value or not, in an iterative manner and as described above. In one embodiment, the neural network is a convolutional neural network.

In one embodiment of the invention, in creating a mini batch by sampling image-mask pairs, as shown at 306 of flowchart 300, the masked region for each image in a mini batch is a randomly sampled rectangle whose location and size may vary over the image. In another embodiment of the invention, the masked region for each image in a mini batch is sampled so as to be of similar relative size and location to the masked region of the user provided image and mask. Images from the retrieval (also referred to herein as retrieved) set may be contained in multiple mini batches. An image selected for multiple mini batches, may have different sampled masked regions in different mini batches. Thus, the convolutional neural network algorithm learns to complete different regions of an image even though it is presented with the same image in different mini batches. In one embodiment, each image from the retrieval set is sampled for a mini batch before repeating sampling of an image for subsequent inclusion in a mini batch. Although not shown in flowchart 300, in some embodiments, the parameters of the neural network are either initialized with random values or pre-trained to facilitate the further training of the neural network for the image completion task at hand, as described in detail above.

Figure 6:
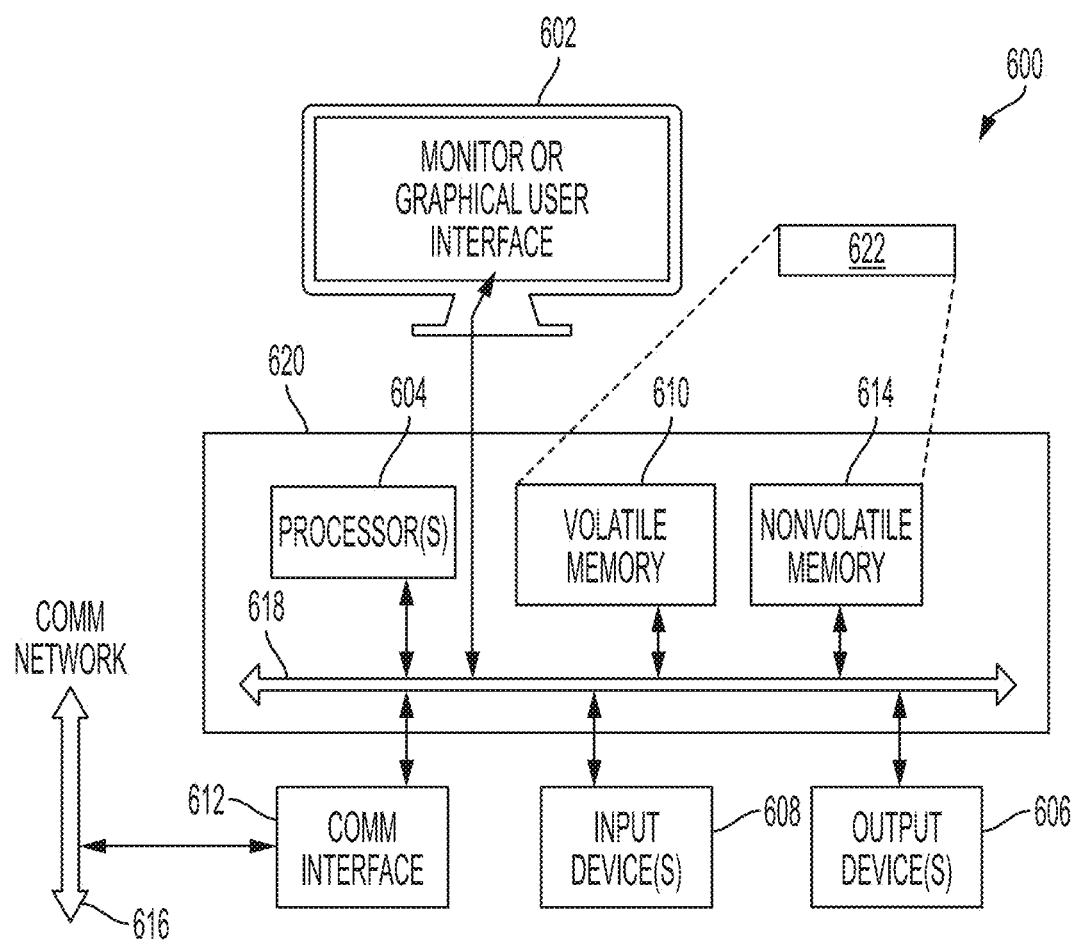
FIG. 6 is a simplified block diagram of an exemplary computing device, in which the various aspects of the present invention may be embodied.

FIG. 6 is an exemplary block diagram of a computing device 600 that may incorporate embodiments of the present invention. FIG. 6 is merely illustrative of a machine system to carry out aspects of the technical processes described herein, and does not limit the scope of the claims. One of ordinary skill in the art would recognize other variations, modifications, and alternatives. In one embodiment, the computing device 600 includes a monitor or graphical user interface 602, a data processing system 620, a communication network interface 612, input device(s) 608, output device(s) 606, and the like.

As depicted in FIG. 6, the data processing system 620 may include one or more central processing units (CPU) or graphical processing units 604 (collectively referred to herein as processor(s)) that communicate with a number of peripheral devices via a bus subsystem 618. These peripheral devices may include input device(s) 608, output device(s) 606, communication network interface 612, and a storage subsystem, such as a volatile memory 610 and a nonvolatile memory 614.

The volatile memory 610 and/or the nonvolatile memory 614 may store computer-executable instructions and thus forming logic 622 that when applied to and executed by the processor(s) 604 implement embodiments of the processes disclosed herein.

The input device(s) 608 include devices and mechanisms for inputting information to the data processing system 620. These may include a keyboard, a keypad, a touch screen incorporated into the monitor or graphical user interface 602, audio input devices such as voice recognition systems, microphones, and other types of input devices. In various embodiments, the input device(s) 608 may be embodied as a computer mouse, a trackball, a track pad, a joystick, wireless remote, drawing tablet, voice command system, eye tracking system, and the like. The input device(s) 608 typically allow a user to select objects, icons, control areas, text and the like that appear on the monitor or graphical user interface 602 via a command such as a click of a button or the like.

The output device(s) 606 include devices and mechanisms for outputting information from the data processing system 620. These may include speakers, printers, infrared LEDs. and so on as well understood in the art.

The communication network interface 612 provides an interface to communication networks (e.g., communication network 616) and devices external to the data processing system 620. The communication network interface 612 may serve as an interface for receiving data from and transmitting data to other systems. Embodiments of the communication network interface 612 may include an Ethernet interface, a modem (telephone, satellite, cable, ISDN), (asynchronous) digital subscriber line (DSL), FireWire, USB, a wireless communication interface such as BlueTooth or WiFi, a near field communication wireless interface, a cellular interface, and the like.

The communication network interface 612 may be coupled to the communication network 616 via an antenna, a cable, or the like. In some embodiments, the communication network interface 612 may be physically integrated on a circuit board of the data processing system 620, or in some cases may be implemented in software or firmware, such as "soft modems", or the like.

The computing device 600 may include logic that enables communications over a network using protocols such as HTTP, TCP/IP, RTP/RTSP, IPX, UDP and the like.

The volatile memory 610 and the nonvolatile memory 614 are examples of tangible media configured to store computer readable data and instructions to implement various embodiments of the processes described herein. Other types of tangible media include removable memory (e.g., pluggable USB memory devices, mobile device SIM cards), optical storage media such as CD-ROMS. DVDs, semiconductor memories such as flash memories, non-transitory read-only-memories (ROMS), battery-backed volatile memories, networked storage devices, and the like. The volatile memory 610 and the nonvolatile memory 614 may be configured to store the basic programming and data constructs that provide the functionality of the disclosed processes and other embodiments thereof that fall within the scope of the present invention.

Logic 622 that implements embodiments of the present invention may be stored in the volatile memory 610 and/or the nonvolatile memory 614. Said software may be read from the volatile memory 610 and/or nonvolatile memory 614 and executed by the processor(s) 604. The volatile memory 610 and the nonvolatile memory 614 may also provide a repository for storing data used by the software.

The volatile memory 610 and the nonvolatile memory 614 may include a number of memories including a main random access memory (RAM) for storage of instructions and data during program execution and a read only memory (ROM) in which read-only non-transitory instructions are stored. The volatile memory 610 and the nonvolatile memory 614 may include a file storage subsystem providing persistent (non-volatile) storage for program and data files. The volatile memory 610 and the nonvolatile memory 614 may include removable storage systems, such as removable flash memory.

The bus subsystem 618 provides a mechanism for enabling the various components and subsystems of data processing system 620 communicate with each other as intended. Although the communication network interface 612 is depicted schematically as a single bus, some embodiments of the bus subsystem 618 may utilize multiple distinct busses.

It will be readily apparent to one of ordinary skill in the art that the computing device 600 may be a device such as a smartphone, a desktop computer, a laptop computer, a rack-mounted computer system, a computer server, or a tablet computer device. As commonly known in the art, the computing device 600 may be implemented as a collection of multiple networked computing devices. Further, the computing device 600 will typically include operating system logic (not illustrated) the types and nature of which are well known in the art.

Those having skill in the art will appreciate that there are various logic implementations by which processes and/or systems described herein can be effected (e.g., hardware, software, or firmware), and that the preferred vehicle will vary with the context in which the processes are deployed. If an implementer determines that speed and accuracy are paramount, the implementer may opt for a hardware or firmware implementation; alternatively, if flexibility is paramount, the implementer may opt for a solely software implementation; or, yet again alternatively, the implementer may opt for some combination of hardware, software, or firmware. Hence, there are numerous possible implementations by which the processes described herein may be effected, none of which is inherently superior to the other in that any vehicle to be utilized is a choice dependent upon the context in which the implementation will be deployed and the specific concerns (e.g., speed, flexibility, or predictability) of the implementer, any of which may vary. Those skilled in the art will recognize that optical aspects of implementations may involve optically-oriented hardware, software, and or firmware.

The above embodiments of the present invention are illustrative and not limitative. Other additions, subtractions or modifications are obvious in view of the present disclosure and are intended to fall within the scope of the appended claims.

What is claimed is:

1. A method of training a neural network to complete an image when masked, the method comprising:
   identifying a plurality of images that are visually similar to the image;
   forming a first subset of images from the plurality of images;
   setting parameters of a neural network to a first set of values in accordance with data represented by the first subset;
   using the neural network having the first set of parameter values to complete the masked image if the neural network having the first set of parameter values is determined to meet a threshold value;
   forming another subset of images, different from the first subset, from the plurality of images if the neural network having the first set of parameter values is determined not to meet the threshold value;
   updating the parameters of the neural network in accordance with data represented by the other subset;
   applying the neural network having the updated parameter values to complete the masked image if the neural network having the updated parameters values is determined to meet the threshold value; and
   repeating the forming of another set and the updating of the parameters if the neural network having the updated set of parameter values is determined not to meet the threshold value.

2. The method of claim 1 said threshold value is defined by a convergence of the neural network.

3. The method of claim 1 wherein said threshold value is defined by a number of updates of the parameters.

4. The method of claim 1 wherein said plurality of images are identified by searching a collection of images.

5. The method of claim 1 wherein said mask is variable.

6. The method of claim 1 further comprising performing a post-processing on the completed image.

7. The method of claim 1 wherein forming the first subset comprises sampling image-mask pairs.

8. The method of claim 7 wherein said sampling is a random sampling.

9. The method of claim 1 wherein the neural network is a convolutional neural network.

10. The method of claim 1 wherein the neural network is pre-trained to perform image completion.

11. A computer system comprising a neural network configured to complete an image when masked, the computer system further configured to:
   identify a plurality of images that are visually similar to the image;
   form a first subset of images from the plurality of images;
   set parameters of a neural network to a first set of values in accordance with data represented by the first subset;
   use the neural network having the first set of parameter values to complete the masked image if the neural network having the first set of parameter values is determined to meet a threshold value;
   form another subset of images, different from the first subset, from the plurality of images if the neural network having the first set of parameter values is determined not to meet the threshold value;

update the parameters of the neural network in accordance with data represented by the other subset; and apply the neural network having the updated parameter values to complete the masked image if the neural network having the updated parameters values is determined to meet the threshold value; and repeat the forming of another set and the updating of the parameters if the neural network having the updated set of parameter values is determined not to meet the threshold value.

12. The computer system of claim 11 wherein said threshold value is defined by a convergence of the neural network.

13. The computer system of claim 11 wherein said threshold value is defined by a number of updates of the parameters.

14. The computer system of claim 11 wherein said plurality of images are identified by searching a collection of images.

15. The computer system of claim 11 wherein said mask is variable.

16. The computer system of claim 11 wherein said computer system is further configured to post-process the completed masked image.

17. The computer system of claim 11 wherein the first subset is formed by sampling image-mask pairs.

18. The computer system of claim 16 wherein said sampling is a random sampling.

19. The computer system of claim 11 wherein the neural network is a convolutional neural network.

20. The computer system of claim 11 wherein the neural network is pre-trained to perform image completion.

* * * * *